(12) United States Patent
Banerjee et al.

(10) Patent No.: US 7,251,674 B2
(45) Date of Patent: Jul. 31, 2007

(54) INTERNATIONALIZATION OF THE WEB SERVICES INFRASTRUCTURE

(75) Inventors: Debasish Banerjee, Rochester, MN (US); Casey Adam Swenson, Kasson, MN (US); David Alan Zavala, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 10/041,219

(22) Filed: Jan. 8, 2002

(65) Prior Publication Data

US 2003/0131049 A1 Jul. 10, 2003

(51) Int. Cl.
G06F 15/16 (2006.01)

(52) U.S. Cl. .................. 709/203; 709/219; 709/230; 709/237; 709/246

(58) Field of Classification Search ............. 709/203, 709/204, 205, 227, 228, 229, 217, 226, 232, 709/237, 246; 717/130
See application file for complete search history.

(56) References Cited

U.S. PATENT DOCUMENTS

| | | | | |
|---|---|---|---|---|
| 5,680,610 A * | 10/1997 | Smith et al. | ............ | 707/10 |
| 5,944,790 A * | 8/1999 | Levy | ............ | 709/218 |
| 6,112,246 A * | 8/2000 | Horbal et al. | ............ | 709/230 |
| 6,147,693 A * | 11/2000 | Yunker | ............ | 345/473 |
| 6,148,290 A | 11/2000 | Dan et al. | ............ | 705/1 |
| 6,161,139 A * | 12/2000 | Win et al. | ............ | 709/225 |
| 6,269,400 B1 * | 7/2001 | Douglas et al. | ............ | 709/224 |
| 6,560,633 B1 * | 5/2003 | Roberts et al. | ............ | 709/202 |
| 6,643,652 B2 * | 11/2003 | Helgeson et al. | ............ | 707/10 |
| 6,704,024 B2 * | 3/2004 | Robotham et al. | ............ | 345/581 |
| 6,792,605 B1 * | 9/2004 | Roberts et al. | ............ | 719/313 |
| 6,857,023 B2 * | 2/2005 | Rivadalla et al. | ............ | 709/230 |
| 6,882,996 B2 * | 4/2005 | Preisig et al. | ............ | 707/4 |
| 6,983,238 B2 * | 1/2006 | Gao | ............ | 704/8 |
| 7,013,289 B2 * | 3/2006 | Horn et al. | ............ | 705/26 |
| 7,072,934 B2 * | 7/2006 | Helgeson et al. | ............ | 709/203 |
| 2002/0046240 A1 * | 4/2002 | Graham et al. | ............ | 709/203 |
| 2002/0162093 A1 * | 10/2002 | Zhou et al. | ............ | 717/130 |
| 2003/0014733 A1 * | 1/2003 | Ringseth et al. | ............ | 717/116 |
| 2003/0078960 A1 * | 4/2003 | Murren et al. | ............ | 709/203 |
| 2003/0079051 A1 * | 4/2003 | Moses et al. | ............ | 709/328 |
| 2003/0105884 A1 * | 6/2003 | Upton | ............ | 709/318 |
| 2003/0115342 A1 * | 6/2003 | Lortz | ............ | 709/229 |

* cited by examiner

*Primary Examiner*—Michael Won
(74) *Attorney, Agent, or Firm*—Patterson & Sheridan, LLP

(57) ABSTRACT

A method and system for processing a Web service request in a distributed computing environment. In one embodiment, the Web service request is processed in a Web service requester. A packet having a header containing an internationalization context of the Web service requester is generated. The packet is then attached to the Web service request. The packet is then sent with the Web service request to the distributed computing environment.

27 Claims, 5 Drawing Sheets

INTERNATIONALIZATION OF THE WEB SERVICES INFRASTRUCTURE

BACKGROUND OF THE INVENTION

1. Field of the Invention

The present invention generally relates to a distributed computer enterprise, and more particularly, to a system and method of providing locale-sensitive operations.

2. Description of the Related Art

In a conventional distributed computer environment, it is often assumed that a server and its clients are operating in the same locale. This assumption no longer holds true, in general, for e-business and Web applications. Managed nodes are often located across national boundaries. Thus, a typical managed network of the type described above may include offices located in numerous countries. Due to the worldwide acceptance of the Internet, a server is now more likely than ever to be physically located across a time zone from a remote user. It is also likely that the remote user will make a request that requires using cultural formatting conventions that are different from those of the server's locale. Conventionally, when a server processes a request from a remote user, the server will treat the request as if it occurred in the locale of the server. Without regard to the locale of the remote user, the server will impose its own local conventions when generating the results from the remote request. The remote user then receives the results of the request in a format that is unfamiliar to the user.

One area posing special problems with regard to request handling conventions is the Web services architecture. Web services architecture is rapidly emerging as the basis for the next generation of the eCommerce infrastructure. Web services are units of application logic providing data and services to other applications. Applications access Web services via standard Web protocols and data formats such as HTTP, XML, and SOAP, independent of how each Web service is implemented. Typically, Web services act as wrappers around server-side components of other distributed application platforms.

In the existing Web services architectures and implementations, there can be locale and time zone mismatches between a Web service requester (client) and a Web service provider (server). That is, the Web service provider freely imposes its locale and time zone in the locale and time zone-sensitive operations requested by the Web service requester.

FIG. 1 illustrates one example of the results from a Web service request made by a Web service requester to a remote Web service provider. In this example, a Spanish client 102 has invoked a locale-sensitive request on an American server 104. In the existing Web services architectures and implementations, the Web service provider always imposes its locale upon the Web service requester. Consequently, the Spanish client will receive results in the format and time zone of the American locale and not in the desired Spanish locale. The desired result in this instance includes a date and currency in the Spanish locale, and a sorted list. As shown, the desired result 106 of the Spanish client 102 was dramatically different from the actual result 108 returned by the American server 104. In the actual result, the server has translated the day and month from Spanish to English language and has also changed the day/date format to an American format. The American server changed the Spanish currency format by substituting commas for periods. And finally, the American server disregarded the tilde over the "n" in the Spanish word pina and provided an incorrect sorted list.

One solution to this problem is to follow a brute force strategy by passing the internationalization information (locales and time zone) explicitly as parameters in the relevant Web services requests. But, this strategy is error prone, cumbersome, and not practical. This strategy further requires modifications to the WSDL (Web services description language) definitions to accommodate the extra parameters, and consequently may not be practicable for existing business components.

A need therefore exists for a method and system for processing a Web service request without the locale and time zone mismatches between the Web service provider and the Web service requester.

SUMMARY OF THE INVENTION

The present invention generally relates to methods for processing a Web service request in a distributed computing environment. In one embodiment, the Web service request is processed in a Web service requester. A packet having an internationalization context of the Web service requester is generated. The packet is then attached to the Web service request. The packet is then sent with the Web service request to the Web service provider. In one embodiment, the packet includes a header that contains the internationalization context.

Another embodiment is directed to a method of processing a Web service request by a Web service provider in a distributed computing environment. The Web service provider receives the Web service request. The internationalization context is extracted from the header. The internationalization context is then stored to a table that associates the internationalization context with the thread upon which the Web service request is executed. The Web service request is then processed according to the internationalization context.

Yet another embodiment is directed to a system in a distributed computing environment. The system includes at least one Web service requester configured to create a Web service request, generate a header for the Web service request, attach the header to the Web service request and send the Web service request with the header to one of at least one Web service provider. The header has an internationalization context of the Web service requester. The system further includes at least one Web service provider communicably linked to the at least one Web service requester. Each one of Web service providers is configured to receive the Web service request with the header, extract the internationalization context from the header, and process the services request according to the internationalization context.

Another embodiment is directed to a computer program for sending a Web service request by a Web service requester in a distributed computing environment. The program includes a code segment for creating the Web service request, a code segment for generating a header having an internationalization context of the Web service requester, a code segment for attaching the header to the Web service request, and a code segment for sending the header with the Web service request to the distributed computing environment.

Another embodiment is directed to a computer program for processing a Web service request by a Web service provider in a distributed computing environment. The computer program includes a code segment for receiving the Web service request having a header, a code segment for extracting an internationalization context from the header, a code segment for storing the internationalization context to a table that associates the internationalization context with the thread upon which the Web service request is executed, and a code segment for processing the Web service request according to the internationalization context.

Yet another embodiment is directed to a Web service requester. The requester includes a memory containing a Web service request-sending program, a processor which, when executing the Web service request-sending program, performs an operation comprising: creating the Web service request, generating a header having an internationalization context of the Web service requester, attaching the header to the Web service request, and sending the header with the Web service request to the distributed computing environment.

Another embodiment is directed to Web service provider, which includes a memory containing a Web service request-processing program, a processor which, when executing the Web service request-processing program, performs an operation comprising: receiving the Web service request having a header, extracting an internationalization context from the header, storing the internationalization context to a table that associates the internationalization context with the thread upon which the Web service request is executed, and processing the Web service request according to the internationalization context.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
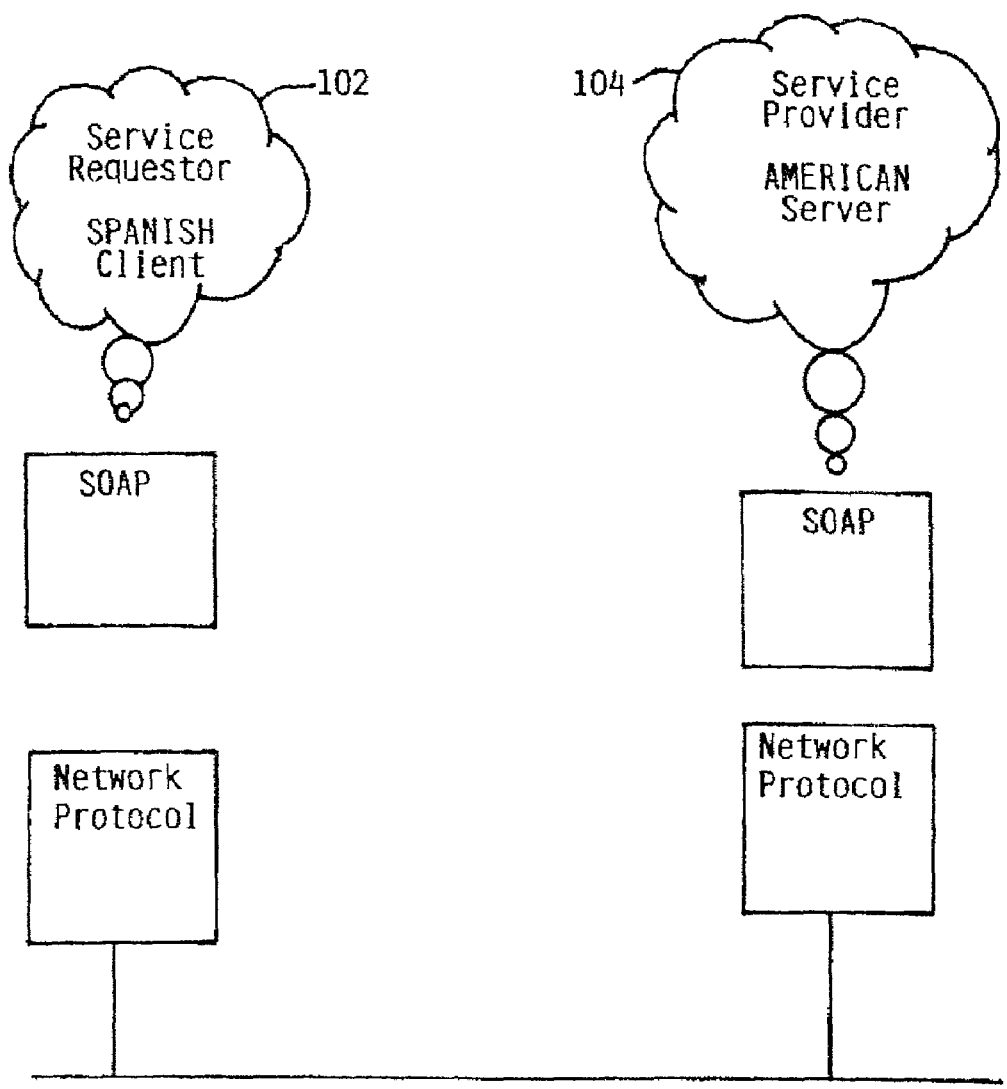
FIG. 1 is an example of the results from a Web service request made by a Web service requester to a remote Web service provider.

The present invention is generally directed to an apparatus, method and article of manufacture for processing Web service requests in a distributed computer network environment using the Web service requester's specified locale conventions. In one embodiment, the Web service requester's specified locale conventions, called the internationalization context, includes the Web service requester's locale and/or time zone information. Prior to sending a Web service request over the network environment to the Web service provider, the Web service requester creates a header using the internationalization context. The header and the Web service request are then sent to the Web service provider. Upon their receipt, the Web service provider extracts the internationalization context from the header and stores that information in a thread context manager table associated with the Web service provider.

Web services are the basis of a next generation of e-business systems architecture. A Web service is an interface that describes a collection of network accessible operations. Web services fulfill a specific task or a set of tasks. They can work with many other Web services in an interoperable manner to carry out their part of a complex aggregation or a business transaction.

A Web service is typically described using description language, such as XML or WSDL (Web services description language). The service description defines details about the operations in a platform neutral manner. The service description also defines everything required to invoke the Web service. The service description abstracts the details of the implementation so that Web services can be invoked at runtime without prior knowledge of the platform, language, or implementation design of the Web service. This allows and encourages Web services based applications to be loosely coupled, component oriented, cross-technology implementations. Any interaction with a Web service can be characterized as invoking the Web service. A Web service can be invoked over a network by using the information contained in the binding details of the service description, i.e., through a messaging protocol, e.g., SOAP.

SOAP is a lightweight protocol for the exchange of information in a decentralized, distributed environment. It is an XML-based protocol that consists of three parts: an envelope that defines a framework for describing what is in a message and how to process it, a set of encoding rules for expressing instances of application-defined data types, and a convention for representing remote procedure calls and responses. SOAP can be used in combination with or re-enveloped by a variety of network protocols, such as HTTP, SMTP, FTP or MQ. SOAP provides a flexible mechanism for extending a message in a decentralized and modular way without prior knowledge between the communicating parties. Typical examples of extensions that can be implemented as header entries are authentication, transaction management, payment, etc.

Since Web services act as wrappers over server-side components, the present invention extends the applicability of the implementation of the internationalization context over a distributed enterprise, referred to as internationalization service, which is discussed in U.S. patent application Ser. No. 09/870,319, filed on May 30, 2001, entitled "LOCALIZATION IN DISTRIBUTED COMPUTER ENVIRONMENTS" by Banerjee et al; and U.S. patent application Ser. No. 10/000,686, filed on Oct. 31, 2001, entitled "MANAGEMENT STRATEGIES FOR INTERNATIONALIZATION IN A DISTRIBUTED COMPUTER ENVIRONMENT" by Banerjee et al. The aforementioned applications are hereby incorporated herein by reference for all purposes. As discussed in these two applications, the internationalization service provides a unique solution to both the locale and time zone mismatch issues in J2EE and CORBA environments. That is, an infrastructure is provided for distributed internationalization in heterogeneous managed environments. The internationalization service transparently propagates the internationalization context consisting of the locale and time zone information using IIOP in J2EE or CORBA environments. The present invention extends the applicability of internationalization service to the domain of Web services.

One embodiment of the invention is implemented as a program product using Axis, which is an Apache open group's implementation of SOAP for Java environments. Another embodiment of the invention is implemented for use with a computer system such as, for example, the distributed computer network environment 200 shown in FIG. 2 and described below. The program(s) of the program product defines functions of the embodiments (including the methods described below with reference to FIGS. 3 and 4) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
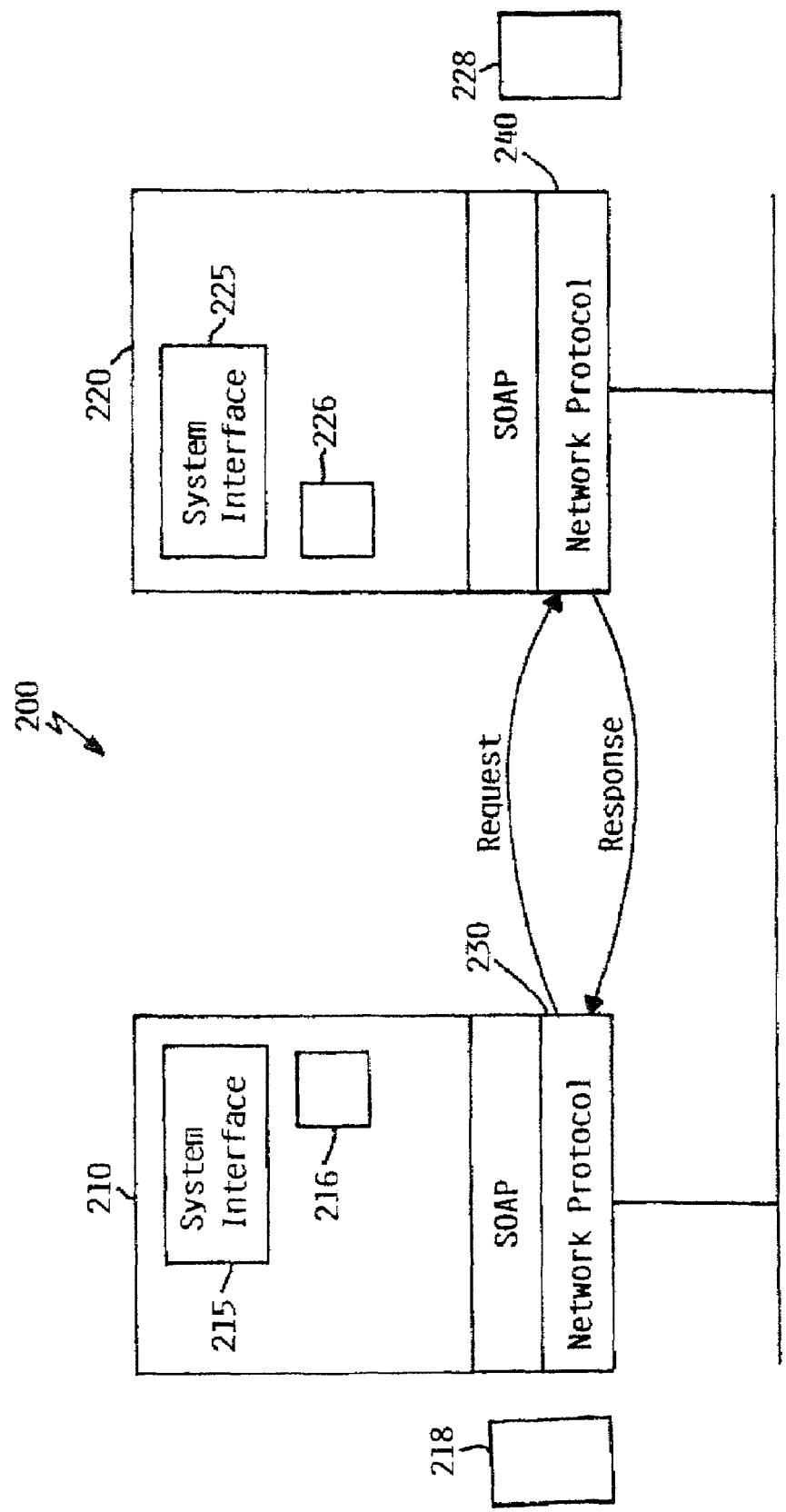
FIG. 2 is a distributed computing network environment in accordance with an embodiment of the present invention.

Referring now to FIG. 2, a distributed computing network environment in accordance with an embodiment of the present invention is shown. The distributed computing network environment 200 includes a Web service requester 210 and a Web service provider 220. The distributed computing network environment 200, however, may include any number of Web service requesters and providers. In one embodiment, a Web service provider is the platform that hosts access to the service. On the other hand, in another embodiment, a Web service requester is the application that is looking for and invoking or initiating an interaction with a service. Note that the Web service provider and the Web service requester roles are logical constructs, and in fact, a single Web service operator may exhibit characteristics of both a Web service provider and a Web service requester. In one embodiment, the Web service requester 210 and provider 220 are eServer iSeries computers available from International Business Machines, Inc., of Armonk, N.Y. As such, the Web service requester 210 and provider 220 may include any combination of hardware and software, such as processors, memories, I/O devices, storage, operating systems, etc. The Web service requester 210 includes a program 216 containing a method of sending a Web service request (as described in FIG. 3 and its accompanying text). In accordance with another embodiment of the present invention, the Web service requester 210 includes a system programming interface 215 for extracting an invocation internationalization context associated with the current thread of execution from a thread context manager table 218 of the internationalization service. The Web service provider 220 includes a program 226 containing a method of processing a Web service request (as described in FIG. 4 and its accompanying text). In accordance with another embodiment of the present invention, the Web service provider 220 includes a system programming interface 225 for associating a caller internationalization context with the current thread of execution from a thread context manager table 228. A thread context manager table of the internationalization service typically maintains association between executing threads and their corresponding internationalization contexts. That is, caller and invocation internationalization contexts are uniquely mapped (associated) to thread identifiers, which are unique numbers that identify a thread executing within a process. In this regard, if a client (i.e., Web service requester) makes a business method request, and the server (i.e., Web service provider) executes this request on the same thread, then the service must preserve the original thread/context association of the client while executing the request. The thread context manager table provides the mechanism necessary to maintain the scope of (i.e., protect) the thread/context associations in this situation.

Continuing with FIG. 2, the Web service requester 210 further includes a network protocol 230, and the Web service provider 220 further includes a network protocol 240. Web services publicly available on the Internet use commonly deployed network protocols. Because if its ubiquity, HTTP is the de-facto standard network protocol for Internet-available Web services. Other Internet protocols may be supported, including SMTP and FTP. Intranet domains may use reliable messaging infrastructures like MQSeries.

Figure 3:
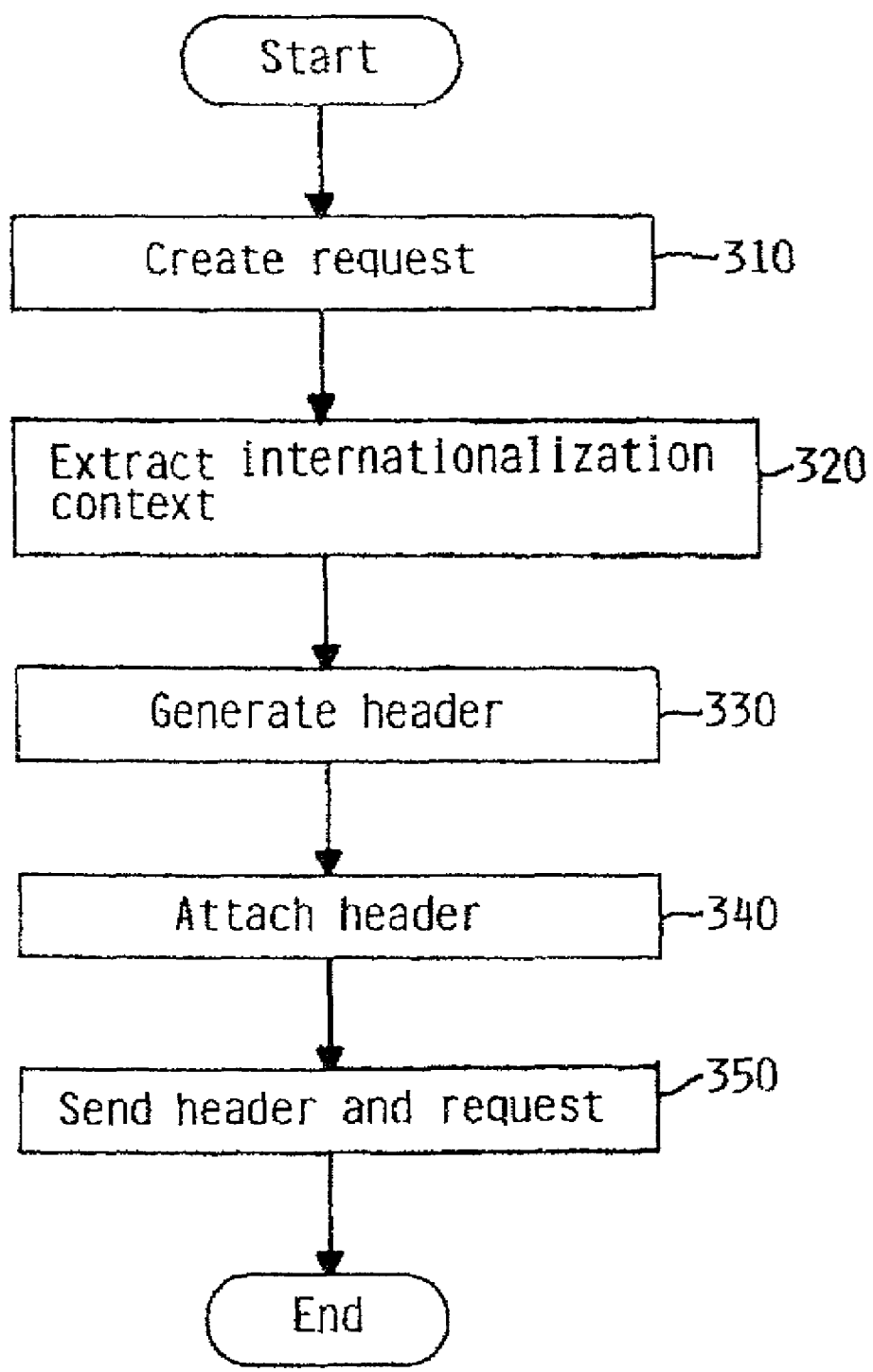
FIG. 3 is a flowchart of a method of sending a Web service request by a Web service requester in accordance with an embodiment of the present invention.

Referring now to FIG. 3, a flowchart of a method of sending a Web service request by a Web service requester in accordance with an embodiment of the present invention is illustrated. After a Web service request is created (block 310), the invocation internationalization context associated with the current thread of execution is extracted using the system programming interface 215, as shown in block 320. The internationalization context is then used to generate a header, as shown in block 330. The header is used to propagate the internationalization context along with the Web service request. In one embodiment, the header is a SOAP header. In another embodiment, the internationalized context is converted to an XML format so that the SOAP header is an XML representation of the internationalization context. In another embodiment, the header consists of a nonempty ordered chain of stringified locales and a time zone identifier. Details of an embodiment of the header consisting of the locales and time zone identifiers will be described in FIG. 5 and its accompanying text. The stringified representation of locale and time zone may be modeled after Java. In accordance with one embodiment of the present invention, the SOAP mustUnderstand attribute is absent from the header. The SOAP mustUnderstand attribute is typically used to indicate whether a header entry is mandatory or optional for the recipient (as defined by the SOAP actor attribute) to process. The value of the mustUnderstand attribute is either "1" or "0". The absence of the SOAP mustUnderstand attribute is semantically equivalent to its presence with the value "0". If a header element is tagged with a SOAP mustUnderstand attribute with a value of "1", the recipient of that header entry either must obey the semantics (as conveyed by the fully qualified name of the element) and process correctly to those semantics, or must fail processing the message. Thus, by excluding the SOAP mustUnderstand attribute from the header, any recipient that is not equipped to correctly process those semantics can simply ignore the SOAP header without generating any fault.

Continuing with FIG. 3, after the header is generated using the internationalization context, the header is attached to the Web service request, as shown in block 340. The header along with the Web service request are then sent over the network environment 200 to the Web service provider 220, as shown in block 350.

Figure 4:
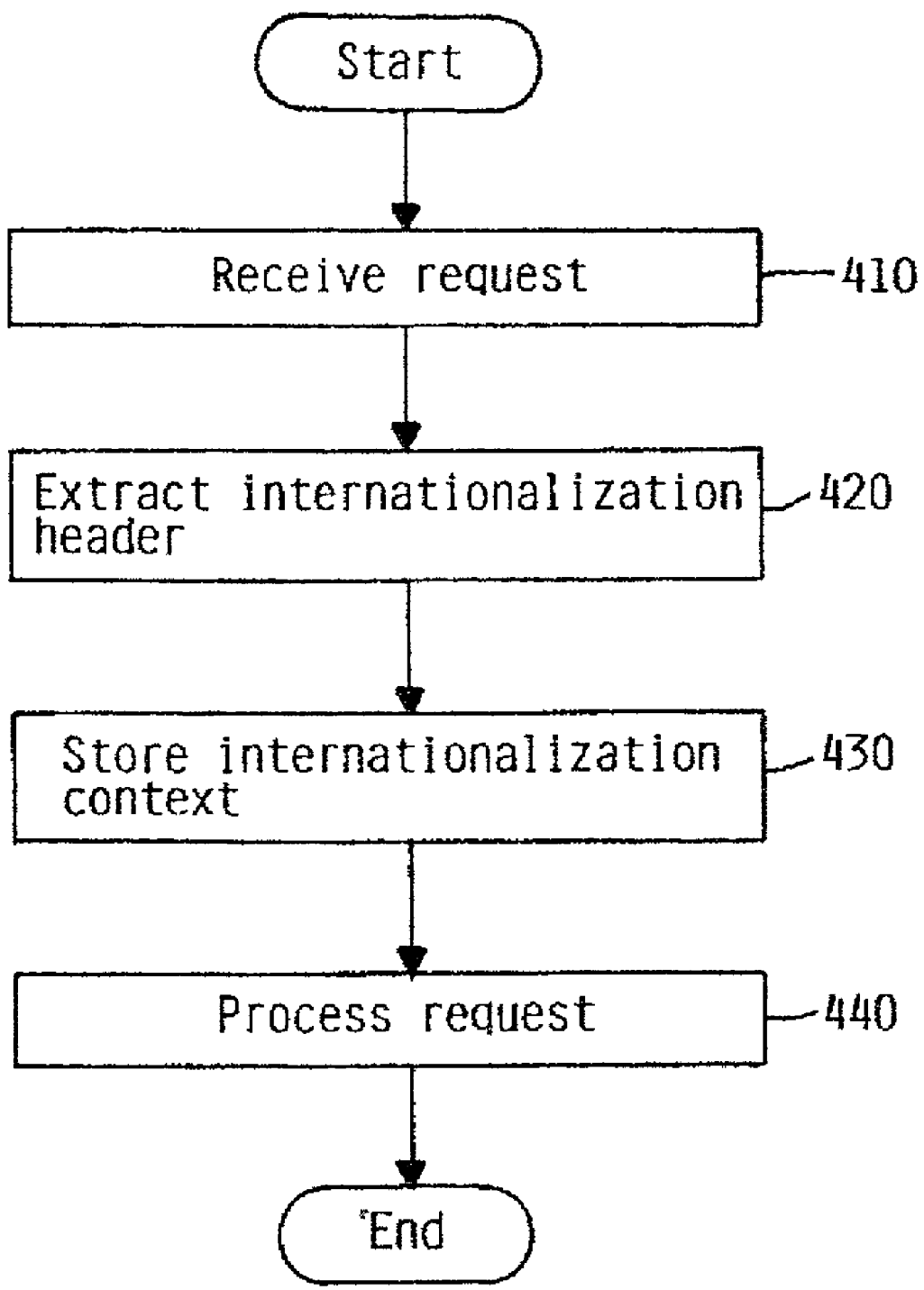
FIG. 4 is a flowchart of a method of processing a Web service request by a Web service provider in accordance with an embodiment of the present invention.

Referring now to FIG. 4, a flowchart of a method of processing a Web service request by a Web service provider in accordance with an embodiment of the present invention is shown. After the Web service provider 220 receives a Web service request (block 410), the caller internationalization context from the header associated with the Web service request is extracted using the system programming interface 225, as shown in block 420. The system programming interface 225 then stores the internationalization context to the thread context manager table 228 of the internationalization service, as shown in block 430. In storing the internationalization context, the system programming interface 225 associates the extracted internationalized context as the caller internationalization context with the current thread of execution in the thread context manager table 228. As such, the internationalization context may be supplied upon request by a Web service provider programmer, and may be propagated to another Web service provider. Once stored, the Web service request is then processed according to the internationalization context, as shown in block 440. The orchestration of the method of processing a Web service request by a Web service provider in accordance with an embodiment of the present invention with the existing internationalization service permits a Web service provider to localize the Web service results according to the desired internationalization context.

Figure 5A:
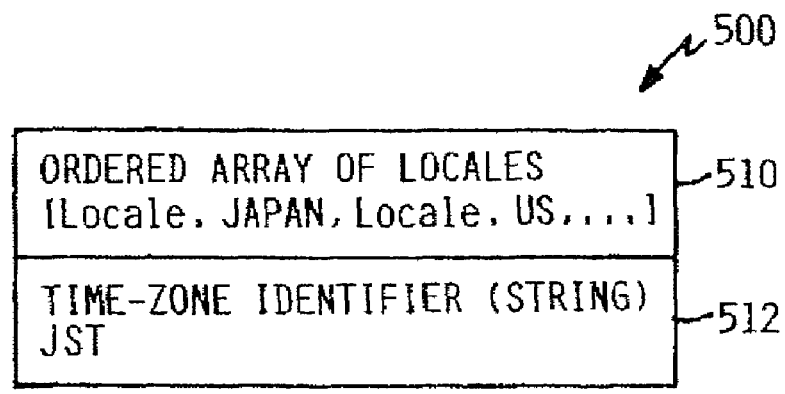
FIGS. 5A and 5B illustrate an internationalization context data structure in accordance with an embodiment of the present invention.
Figure 5B:
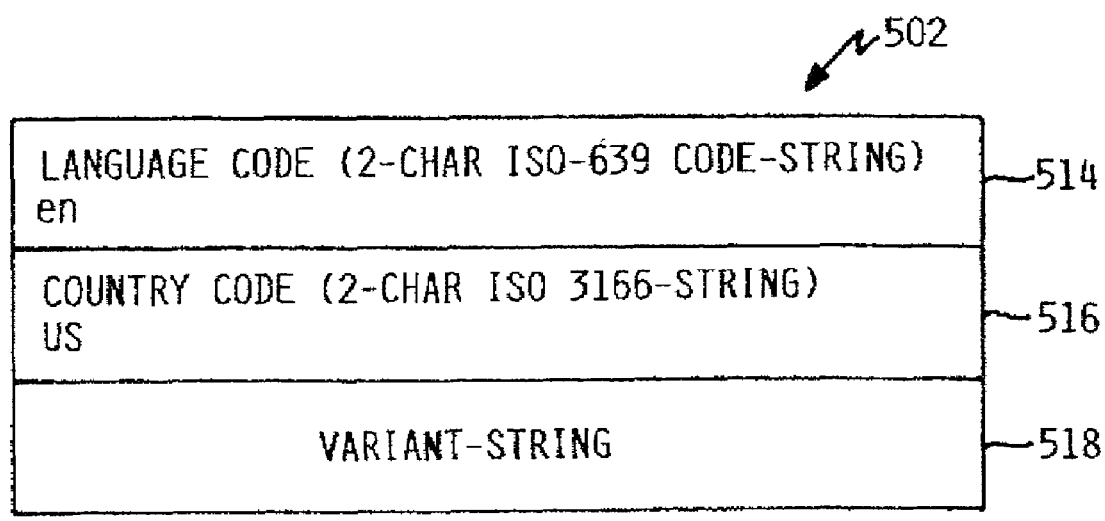

FIG. 5A illustrates one embodiment of an internationalization context header 500. The internationalization context generally contains a Web service requester's locale and/or time zone information for processing a Web service request. Illustratively, the internationalization context header 500 comprises an ordered array of locales 510 and a time-zone identifier 512. The ordered array of locales is a sequential list of preferred locales for processing the client request. Locales are typically ordered according to the Web service requester's preference. In one embodiment, the most preferred locale is the client locale. However, a Web service requester programmer may select any locale contained in the list for processing the Web service request. FIG. 5B further illustrates the header for a locale entry 502 contained in the ordered array of locales 510. Illustratively, the locale entry 502 comprises a language code 514, a country code 516 and a variant-string 518. The language code 514 may be a two character ISO-639 standard identifier. The country code 516 may be a two character ISO-3166 standard identifier. The variant-string 518 may contain further locale sensitive information such as currency formatting data or specifying a region within a country, for example.

One of ordinary skill will appreciate that the foregoing illustrated example of the internationalization context header 500 is merely representative. It should be appreciated that other logical combinations of locale specific information may be contained in the internationalization context header 500. In particular, the internationalization context 510 and the time zone identifier 512 may be spread over a plurality of data structures and cross referenced by pointers.

In some cases, an impedance mismatch between the data type used to represent the internationalization context in the thread context manager table and the XML data type used to represent the same information in the SOAP header may occur, such as, the mismatch between an XML syntax used in the SOAP header and the corresponding J2EE standard objects (locales and time zones). In one embodiment, the programs 216 and 226 perform the necessary data type transformations to compensate for the impedance mismatches.

In one aspect, the embodiments of the present invention allow the propagation of internationalization context to be completely transparent. In that regard, the existence and the use of the SOAP header in accordance with embodiments of the present invention are transparent to Web services programmers.

While the foregoing is directed to embodiments of the present invention, other and further embodiments of the invention may be devised without departing from the basic scope thereof, and the scope thereof is determined by the claims that follow.

What is claimed is:

1. A method of sending a Web service request by a Web service requester to a Web service provider, comprising:
generating a packet having an internationalization context of the Web service requester, wherein the internationalization context specifies locale conventions of the requester that should be used to format a response to the request, and wherein the packet comprises a simple object access protocol (SOAP) header containing the internationalization context;
attaching the packet to a Web service request; and
sending the packet with the Web service request to the Web service provider.

2. The method of claim 1, further comprising, prior to generating the packet having an internationalization context of the Web service requester, extracting an internationalization context from a table that associates the internationalization context with a thread upon which the Web service request is executed.

3. The method of claim 1, wherein generating the packet having an internationalization context of the Web service requester comprises converting the internationalization context to an XML format.

4. The method of claim 1, wherein a must understand attribute is absent from the SOAP header.

5. The method of claim 1, wherein the packet further comprises one of a stringified representation of a country identifier, a stringified representation of a language identifier, a stringified representation of a time zone identifier and a stringified representation of a variant identifier.

6. The method of claim 5, wherein the variant identifier provides further specification to one of the country identifier and the language identifier.

7. The method of claim 5, wherein the variant identifier comprises a country region identifier.

8. The method of claim 5, wherein the variant identifier comprises a language dialect identifier.

9. The method of claim 1, wherein the internationalization context is an invocation internationalization context.

10. A method of processing a Web service request by a Web service provider in a distributed computing environment, the method comprising:
    receiving the Web service request having a packet, wherein the packet comprises a simple object access protocol (SOAP) header containing an internationalization context;
    extracting the internationalization context from the packet, wherein the internationalization context specifies a requester's locale conventions that should be used to format a response to the request;
    storing the internationalization context to a table that associates the internationalization context with the thread upon which the Web service request is executed; and
    processing the Web service request according to the internationalization context.

11. The method of claim 10, wherein the a must understand attribute is absent from the SOAP header.

12. The method of claim 10, wherein the packet further comprises one of a stringified representation of a country identifier, a stringified representation of a language identifier, a stringified representation of a time zone identifier and a stringified representation of a variant identifier.

13. The method of claim 12, wherein the variant identifier provides further specification to one of the country identifier and the language identifier.

14. The method of claim 12, wherein the variant identifier comprises a country region identifier.

15. The method of claim 12, wherein the variant identifier comprises a language dialect identifier.

16. The method of claim 10, wherein the internationalization context is a caller internationalization context.

17. A computer-readable storage medium containing a program which, when executed by a processor, performs an operation of sending a Web service request by a Web service requester to a Web service provider, the operation comprising:
    generating a packet having an internationalization context of the Web service requester, wherein the internationalization context specifies the requester's locale conventions that should be used to format a response to the request, and wherein the packet comprises a simple object access protocol (SOAP) header containing the internationalization context;
    attaching the packet to a Web service request; and
    sending the packet with the Web service request to the Web service provider.

18. The computer-readable storage medium of claim 17, wherein the operation further comprises, prior to generating the packet having the internationalization context of the Web service requester, extracting the internationalization context from a table that associates the internationalization context with a thread upon which the Web service request is executed.

19. The computer-readable storage medium of claim 17, wherein generating the packet having the internationalization context of the Web service requester comprises converting the internationalization context to an XML format.

20. The computer-readable storage medium of claim 17, wherein the packet further comprises one of a stringified representation of a country identifier, a stringified representation of a language identifier, a stringified representation of a time zone identifier and a stringified representation of a variant identifier.

21. A computer readable storage medium containing a computer program for sending a Web service request by a Web service requester in a distributed computing environment embodied in a computer program, the program comprising:
    a code segment for creating the Web service request;
    a code segment for generating a packet having an internationalization context of the Web service requester, wherein the internationalization context specifies the requester's locale conventions that should be used to format a response to the request, and wherein the packet comprises a simple object access protocol (SOAP) header containing the internationalization context;
    a code segment for attaching the packet to the Web service request; and
    a code segment for sending the packet with the Web service request to the distributed computing environment.

22. The computer program of claim 21, wherein the code segment for generating a packet having an internationalization context of the Web service requester comprises a code segment for extracting an internationalization context from a table that associates the internationalization context with a thread upon which the Web service request is executed.

23. A computer readable storage medium containing a computer program for processing a Web service request by a Web service provider in a distributed computing environment embodied in a computer program, the computer program comprising:
    a code segment for receiving the Web service request having a packet, wherein the packet comprises a simple object access protocol (SOAP) header containing an internationalization context;
    a code segment for extracting the internationalization context from the packet wherein the internationalization context specifies a requester's locale conventions that should be used to format a response to the request;
    a code segment for storing the internationalization context to a table that associates the internationalization context with the thread upon which the Web service request is executed; and
    a code segment for processing the Web service request according to the internationalization context.

24. A Web service requester, comprising:
    a memory containing a Web service request-sending program;
    a processor which, when executing the Web service request-sending program, performs an operation comprising:
        creating the Web service request;
        generating a packet having an internationalization context of the Web service requester, wherein the internationalization context specifies the requester's locale conventions that should be used to format a response to the request and wherein the packet comprises a simple object access protocol (SOAP) header containing the internationalization context;
        attaching the packet to the Web service request; and
        sending the packet with the Web service request to the distributed computing environment.

25. The Web service requester of claim 24, wherein the operation of the Web service request-sending program further comprises a system programming interface for extracting the internationalization context from a table that associates the internationalization context with a thread upon which the Web service request is executed.

26. A Web service provider, comprising:
a memory containing a Web service request-processing program;
a processor which, when executing the Web service request-processing program, performs an operation comprising:
  receiving the Web service request having a packet, wherein the packet comprises a simple obiect access protocol (SOAP) header containing an internationalization context;
  extracting the internationalization context from the packet, wherein the internationalization context specifies a requester's locale conventions that should be used to format a response to the request;
  storing the internationalization context to a table that associates the internationalization context with the thread upon which the Web service request is executed; and
  processing the Web service request according to the internationalization context.

27. The Web service provider of claim 26, wherein the operation of the Web service request-processing program further comprises a system programming interface for storing the internationalization context to a table that associates the internationalization context with the thread upon which the Web service request is executed.

* * * * *